(12) United States Patent
Ferguson

(10) Patent No.: US 6,215,502 B1
(45) Date of Patent: *Apr. 10, 2001

(54) METHOD AND APPARATUS FOR AUTOMATICALLY RECONFIGURING GRAPHICAL OBJECTS RELATIVE TO NEW GRAPHICAL LAYOUTS

(75) Inventor: Gary J. Ferguson, Cupertino, CA (US)

(73) Assignee: CKS Partners, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/739,033

(22) Filed: Oct. 28, 1996

(51) Int. Cl.⁷ .................................................. G06T 17/00
(52) U.S. Cl. ............................................ 345/433; 345/437
(58) Field of Search ................................. 345/433, 342, 345/121, 339, 437

(56) References Cited

U.S. PATENT DOCUMENTS

| | | | |
|---|---|---|---|
| 5,437,008 | * 7/1995 | Gay et al. ............................. | 707/502 |
| 5,459,825 | * 10/1995 | Anderson et al. .................... | 345/433 |
| 5,544,288 | * 8/1996 | Morgan et al. ....................... | 345/342 |
| 5,570,462 | * 10/1996 | McFarland ........................... | 345/433 |
| 5,572,639 | * 11/1996 | Gantt ..................................... | 345/433 |
| 5,588,108 | * 12/1996 | Kumar et al. ........................ | 345/348 |
| 5,649,216 | * 7/1997 | Sieber ................................... | 707/506 |
| 5,673,421 | * 9/1997 | Shirakawa ............................ | 345/508 |
| 5,682,529 | * 10/1997 | Hendry et al. ....................... | 345/342 |
| 5,699,535 | * 12/1997 | Amro ..................................... | 345/342 |
| 5,745,122 | * 4/1998 | Gay et al. ............................. | 345/433 |
| 5,751,283 | * 5/1998 | Smith .................................... | 345/342 |
| 5,838,317 | * 11/1998 | Bolnick et al. ....................... | 345/339 |
| 5,844,558 | * 12/1998 | Kumar et al. ........................ | 345/339 |
| 5,848,399 | * 12/1998 | Burke .................................... | 345/433 |
| 5,852,447 | * 12/1998 | Hosoya et al. ....................... | 345/468 |
| 5,877,775 | * 3/1999 | Theisen et al. ...................... | 345/440 |
| 5,883,625 | * 3/1999 | Crawford et al. ................... | 345/340 |

\* cited by examiner

Primary Examiner—Cliff N. Vo
(74) Attorney, Agent, or Firm—Blakely, Sokoloff, Taylor & Zafman

(57) ABSTRACT

A method and apparatus for generating graphical objects. One embodiment of the invention includes generating a graphical object in a first graphical layout and behavioral attribute data associated with the graphical object. The behavioral attribute data defines physical parameters of the graphical object relative to a graphical layout. In response to placing the graphical object in a second graphical layout, the behavior attribute data is configured to automatically and dynamically manipulate the physical parameters of the graphical object with respect to the second graphical layout. The behavioral attribute data includes position attribute data defining a position of the graphical object with respect to the first graphical layout. The position attribute data dynamically and automatically manipulates a position of the graphical object in response to the graphical object being placed in the second graphical layout. The position attribute data further defines a position on an X axis and a Y axis of a two dimensional graph and rotational position with respect to the first graphical layout. The behavioral attribute data also includes scaling attribute data indicative of a size of the graphical object with respect to a size of the first graphical layout. The scaling attribute data automatically and dynamically manipulates scales the size of the graphical art object in response to the graphical object being placed in the second graphic layout.

20 Claims, 5 Drawing Sheets

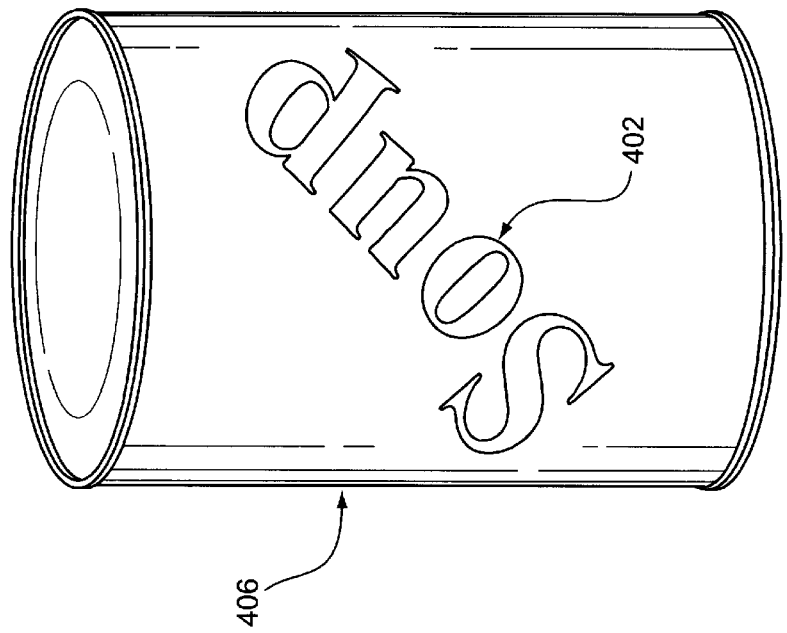
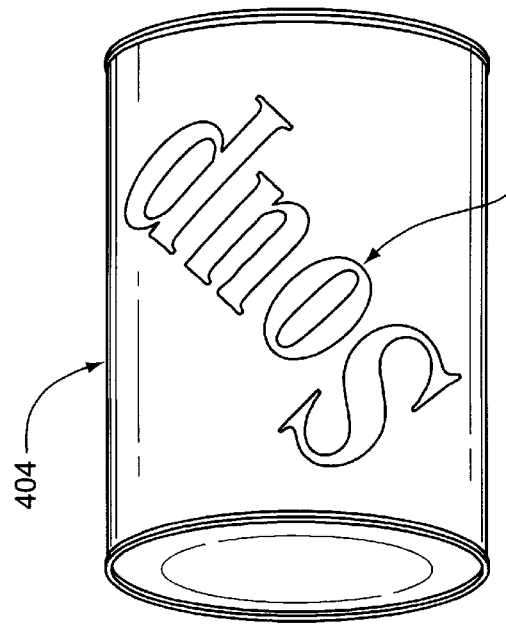
FIG. 4

METHOD AND APPARATUS FOR AUTOMATICALLY RECONFIGURING GRAPHICAL OBJECTS RELATIVE TO NEW GRAPHICAL LAYOUTS

BACKGROUND OF THE INVENTION

1. Field of the Invention

The present invention is related to computer generated graphical objects, and in particular, automatic and dynamic manipulation of graphical objects when placed in a new graphical layout.

2. Description of Related Art

When computer generated graphical objects are initially generated they are typically scaled and positioned relative to the parameters of a graphical layout and background. The objects may be saved and subsequently re-used in a new graphical layout having a size and/or objects in the background which are different from the initial layout and background.

When the objects are re-used they typically should be scaled and positioned relative to the new graphical layout and background in order to be consistent with the physical parameters of the initial graphical objects. However, considering the original objects are generated as static objects, each time the graphical objects are placed in a new graphical layout, the graphical objects usually need to be manually scaled and re-positioned.

Manually manipulating the objects, as expected, is a very time consuming and tedious process. Very often, the objects must be regenerated from scratch when placed in a new layout in order to be consistent with the original graphical objects.

Therefore, what is needed is a method and apparatus for generating a graphical object that includes a data defining physical parameter relative to a graphical layout and background, wherein each time the object is placed in a different graphical layout, the data defining physical parameter automatically and dynamically manipulates the graphical object relative to the new graphical layout.

SUMMARY OF THE INVENTION

The present invention provides a method and apparatus for generating graphical objects. One embodiment of the invention includes generating a graphical object in a first graphical layout and behavioral attribute data associated with the graphical object. The behavioral attribute data defines physical parameters of the graphical object relative to a graphical layout. In response to placing the graphical object in a second graphical layout, the behavior attribute data is configured to automatically and dynamically manipulate the physical parameters of the graphical object with respect to the second graphical layout.

The behavioral attribute data includes position attribute data defining a position of the graphical object with respect to the first graphical layout. The position attribute data dynamically and automatically manipulates a position of the graphical object in response to the graphical object being placed in the second graphical layout. The position attribute data further defines a position on an X axis and a Y axis of a two dimensional graph and rotational position with respect to the first graphical layout.

The behavioral attribute data also includes scaling attribute data indicative of a size of the graphical object with respect to a size of the first graphical layout. The scaling attribute data automatically and dynamically scales the size of the graphical art object in response to the graphical object being placed in the second graphic layout.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates the present invention implemented on a product.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
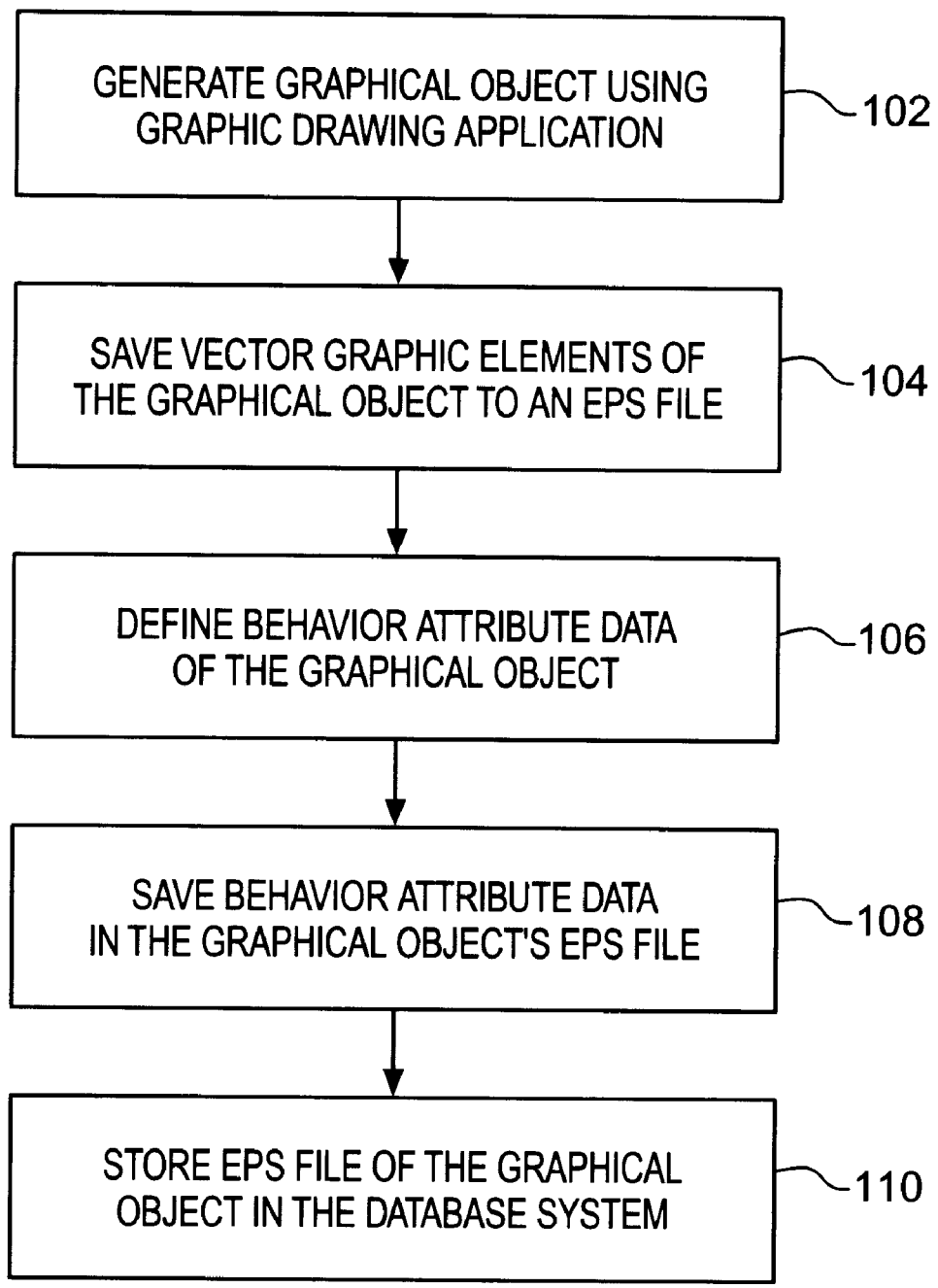
FIG. 1 is a flow diagram illustrating the steps of implementing the present invention according to one embodiment.

FIG. 1 is a flow diagram illustrating the steps generating a graphical object having the ability to automatically and dynamically manipulate its physical parameters relative to a present graphical layout and background, according to one embodiment of the invention.

In step 102, a graphical object is generated using a standard graphic drawing application. In step 104, the vector graphic elements of the graphical object are saved as an "Encapsulated Postscript" (EPS) file. In step 106, the graphical object is then placed in a graphical layout and further manipulated to define specific behavior attribute data, which defines physical parameters of the graphical object with respect to graphical layout in which the graphical object has been placed. In one embodiment, the behavior attribute data includes a scaling range (size) relative to the parameter of the layout, a scaling range relative to the other objects in the background of the layout, a rotational position, and an X and Y coordinate position on the layout.

In alternative embodiments, the behavior attribute data may also include intelligent clipping paths (Smart Crops) with resolution sub-sampling capabilities also including the usual PM attributes, and intelligent stroke and fill colors that are sensitive to the hosting Smart Dieline.

In step 108, the behavior attribute data is saved as a part of the graphical object by appending the behavior attribute data to the EPS file, thereby establishing the graphical object as what is hereinafter referred to as a "smart art". In one embodiment, the behavior attribute data can be appended to the EPS file by being written into a data fork of the EPS file, a resource fork of the EPS file, or written into a separate data object linked to the EPS file.

In step 110, the graphical object, represented as an EPS file embedded with the behavior attribute data, is stored in a database system. When the graphical object is stored in the database it is assigned a unique identifier (Id) number that should not be changed. Additional smart art can be generated in the same manner as described in steps 102–110.

Figure 2:
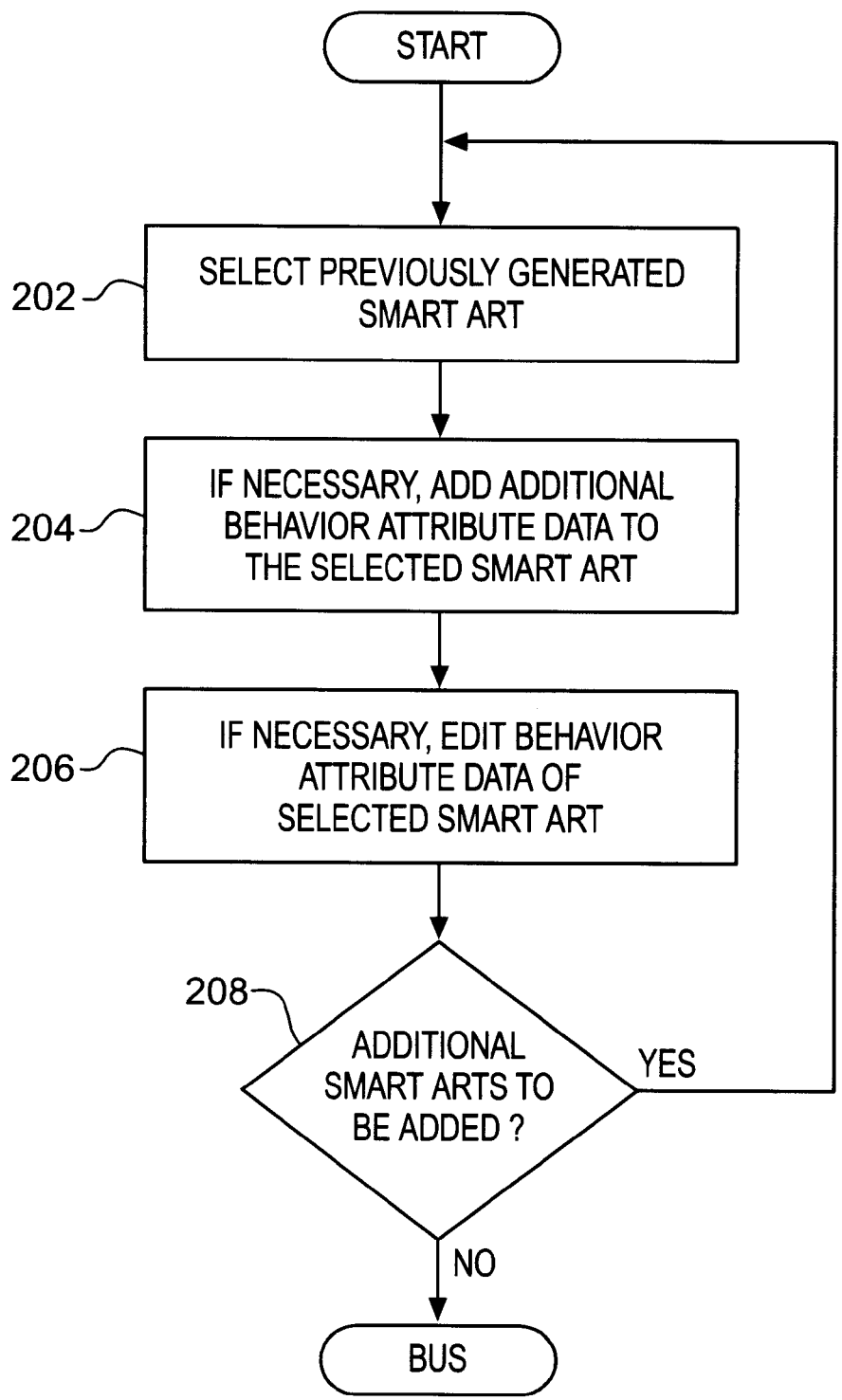
FIG. 2 is a flow diagram illustrating the steps of joining several graphical objects according to one embodiment of the invention.

FIG. 2 is a flow diagram illustrating the steps of joining several smart arts to generate a smart assembly according to one embodiment of the invention. In step 202, a previously generated smart art is selected from the database. In one embodiment, a pop-up menu provides a list of previously generated smart art. A smart art is selected from the list (this part may be a single smart art or a compound of several smart arts). In response, the selected smart art is placed in a present graphical layout.

In step 204, additional behavior attribute data may be added to the selected smart art in the same manner as described in steps 102–110. In step 206, existing behavior attribute data of a selected smart art may be edited. In one embodiment, to modify the existing behavior attribute data, a pop-up menu is activated to display a table of stored behavior attribute data for a selected part. A specific behavior attribute data is selected. In response, the selected behavior attribute data is displayed, edited, and saved directly to the EPS file of the concurrently selected smart art.

In step 208, it is determined whether additional smart art is to be added to the smart assembly concurrently being generated. If any smart art remains to be added, steps 202–206 are repeated in a similar manner to complete the desired layout of smart art into a smart assembly. Otherwise, the generated smart assembly is saved to the database and is assigned a unique Id number which is used to subsequently access the smart assembly. More specifically, the smart assembly is stored in the database embedded with the unique Id numbers of all the smart art that has been selected in generating the smart assembly. The next time the smart assembly is accessed, all the component smart art of the smart assembly and their respective behavior attribute data will be accessed.

Figure 3:
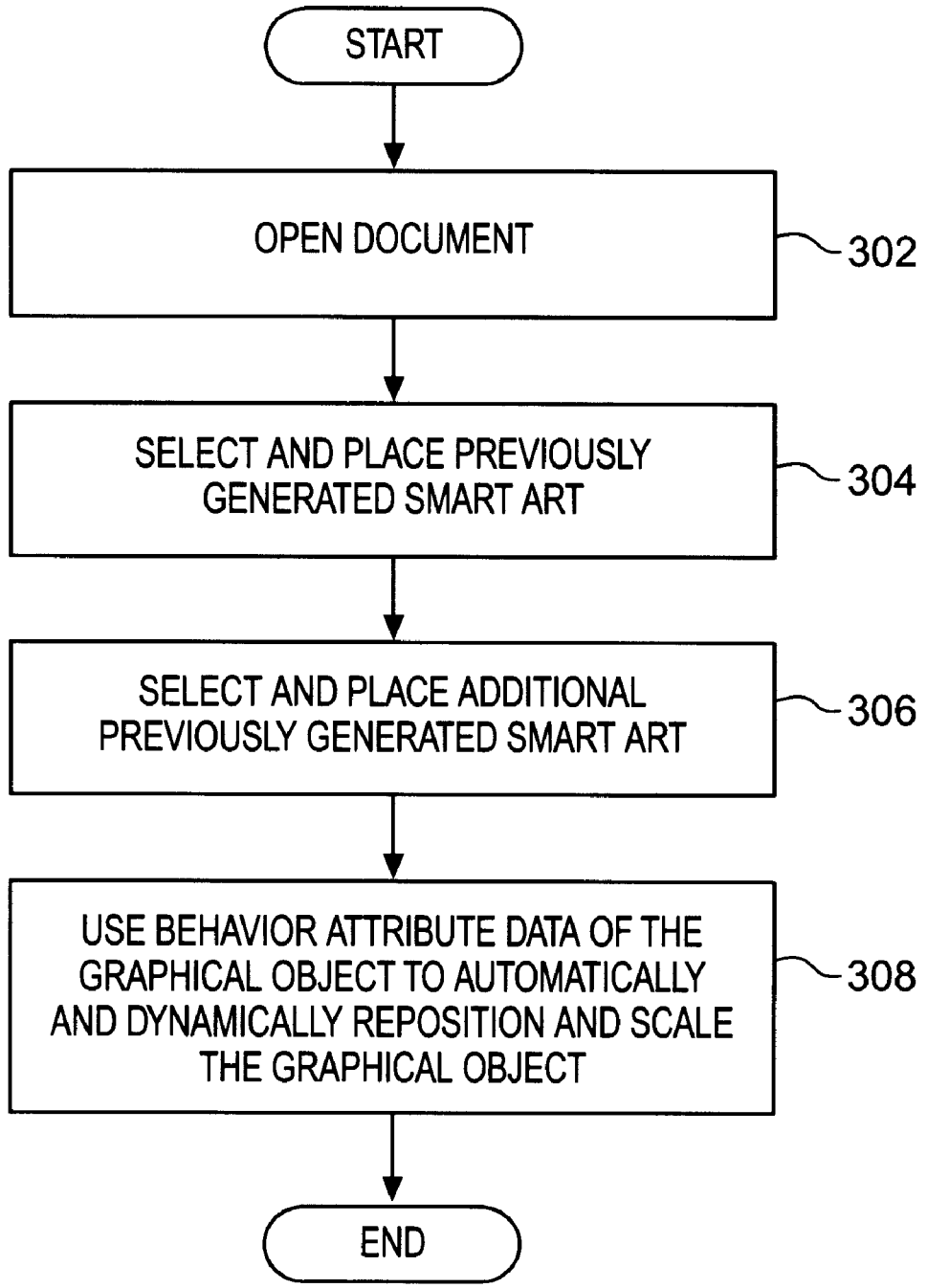
FIG. 3 is a flow diagram illustrating the retrieval and interpretation of the present invention according to one embodiment.

FIG. 3 is a flow diagram illustrating the retrieval and interpretation of the smart art and smart assemblies according to one embodiment of the invention. In step 302, a document is opened using either a default "untitled" document or by opening an existing document. In step 304, a smart art or smart assembly is accessed from the database by selecting from a pop-up menu displaying a list of available smart art. The selected smart art is navigated and placed. In response, the embedded behavior attribute data of the selected object is provided from the database.

In step 306, additional smart art and/or smart assemblies are added to the previously selected smart art. The subsequently selected smart art is placed in the document in order to establish a layering hierarchy in which the objects will be associated with one another (starting with the bottom working up to the top.)

In step 308, an operator enters a request to apply the behavior attribute data embedded in the EPS file of each selected smart art. In response, the behavior attribute data appended to the graphical object of the selected smart art, automatically and dynamically repositions and manipulates the physical parameters of the graphical object relative to the present graphical layout, as initially defined in the behavior attribute data.

FIG. 4 illustrates an example of a smart art 402 generated defined with respect to a first graphical layout 404. As shown on the first layout 404, the smart art is initially given a 45° angle and is scaled to ¼ of the height and ¾ of the width of the first layout 404. The smart art 402 is subsequently placed on a second layout 406 that is much larger in size. In response, the smart art automatically and dynamically expands to ¼ of the height and ¾ of the width of the second layout 406 and rotates to a 45° angle.

Figure 5:
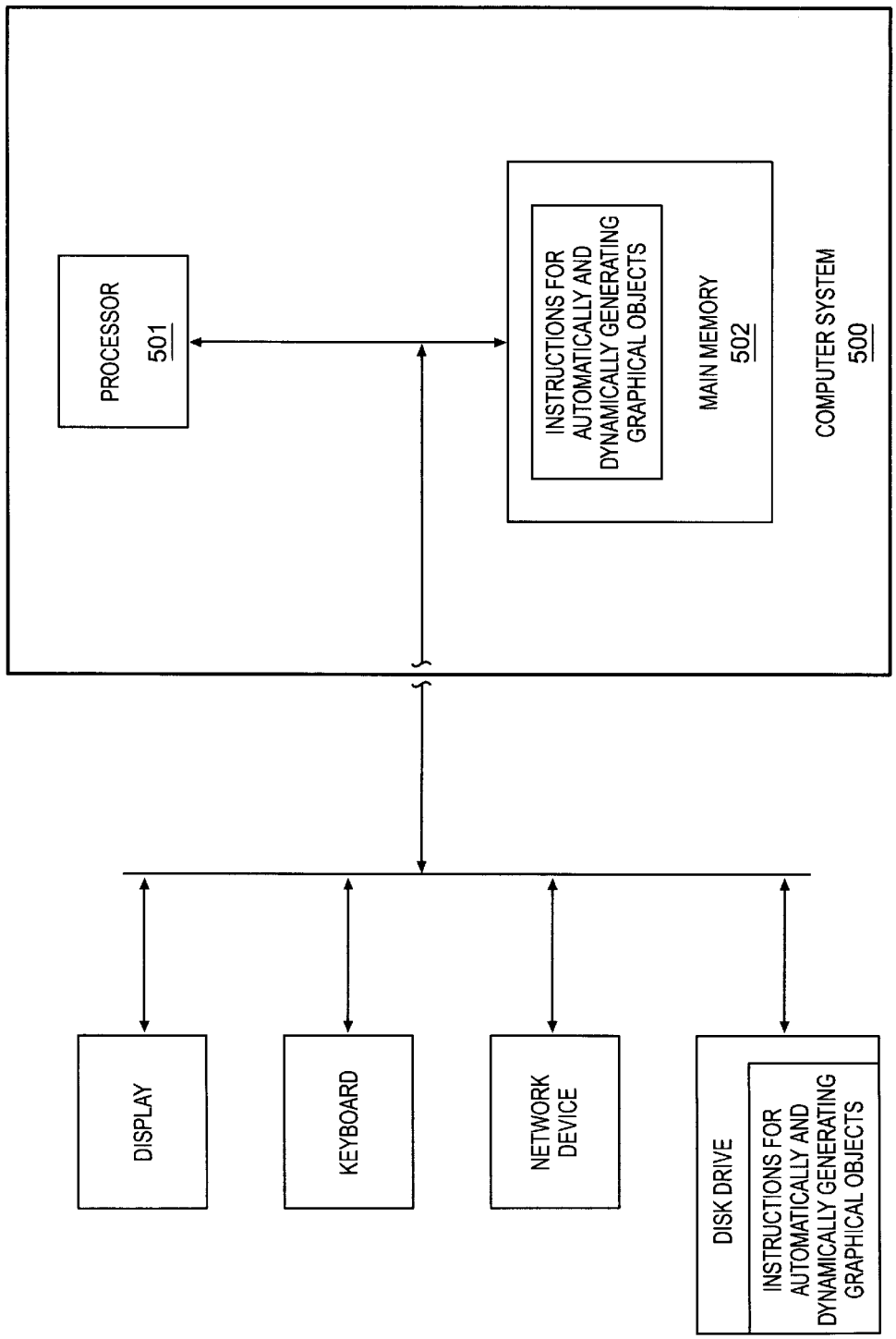
FIG. 5 illustrates a computer system implementing the present invention according to one embodiment.

FIG. 5 illustrates an exemplary computer system 500 that implements the present invention. As shown, the computer system includes a processor 501 for executing instructions and performing other functions to operate the computer system. Attached to the computer system is a monitor, keyboard, disk drive, and a network device that enables the computer system to communicate with other computer devices via a network. The computer system 500 further includes a main memory 502 for storing information and instructions, including instructions to automatically and dynamically generate graphical objects according to one embodiment of the present invention. In alternative embodiments, the present invention of automatically and dynamically generating graphical objects could be provided by a network server.

Alternatively, instructions to automatically and dynamically generate graphical objects according to the present invention may be provided on another computer-readable storage medium including floppy disks, optical disks, CD-ROMs, and magneto-optical disks, or any type of memory including ROMs, RAMs, EPROMs, EEPROMs, magnetic or optical cards, or any type of media suitable for storing electronic instructions.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A computer implemented method for generating graphical objects comprising:

a) generating a graphical object in a first graphical layout;

b) generating behavioral attribute data associated with the graphical object, said behavioral attribute data defining physical parameters of the graphical object in a first position relative to the first graphical layout, including a position on an X axis and a Y axis of a two dimensional graph and rotational position with respect to the first graphical layout; and c) in response to placing said graphical object in a second graphical layout, automatically and dynamically manipulating said physical parameters of said graphical object to reposition said graphical object to said first position relative to said second graphical layout as defined in said behavioral attribute data, including said position on an X axis and Y axis and said rotational position.

2. The method of claim 1, wherein the behavioral attribute data includes position attribute data defining a position of the graphical object with respect to said first graphical layout, the position attribute data dynamically and automatically manipulates a position of the graphical object in response to the graphical object being placed in the second graphical layout.

3. The method of claim 2, wherein the behavioral attribute data includes scaling attribute data indicative of a size of the graphical object relative to a size of the first graphical layout, the scaling attribute data automatically and dynamically manipulates the size of the graphical object in response to the graphical object being placed in the second graphic layout.

4. The method of claim 3, wherein the behavioral attribute data is retrievable and modifiable separate from the graphical object.

5. The method of claim 4, wherein the behavioral attribute data is encoded with the graphical object in an encapsulated postscript element.

6. The method of claim 5, wherein the behavioral attribute data is encoded with a unique identifier.

7. The method of claim 6, wherein the behavioral attribute data further includes customized package data that specify graphic standards corresponding to a package attribute including product type, market location, package size, distribution channel, or language usage, the customized package data automatically and dynamically manipulating the physical parameters of the graphical object in response to identification of a package type.

8. A computer-readable medium having stored thereon a plurality of instructions, including a first set of instructions for generating graphical objects, said first of instructions, when executed by a processor, cause said processor to:

a) generate a graphical object in a first graphical layout;

b) generate behavioral attribute data associated with the graphical object, said behavioral attribute data defining physical parameters of the graphical object in a first position relative to the first graphical layout, including a position on an X axis and a Y axis of a two dimensional graph and rotational position with respect to the first graphical layout; and c) in response to placing said graphical object in a second graphical layout, automatically and dynamically manipulates said physical parameters of said graphical object to reposition said graphical object to said first position relative to said second graphical layout as defined in said behavioral attribute data, including said position on an X axis and Y axis and said rotational position.

9. The computer-readable medium of claim 8, wherein the behavioral attribute data includes position attribute data defining a position of the graphical object with respect to said first graphical layout, the position attribute data dynamically and automatically manipulates a position of the graphical object in response to the graphical object being placed in the second graphical layout.

10. The computer-readable medium of claim 9, wherein the behavioral attribute data includes scaling attribute data indicative of a size of the graphical object with respect to a size of the first graphical layout, the scaling attribute data automatically and dynamically manipulates the size of the graphical object in response to the graphical object being placed in the second graphical layout.

11. A The computer-readable medium of claim 10, wherein the behavioral attribute data is retrievable and modifiable separate from the graphical object.

12. The computer-readable medium of claim 11, wherein the behavioral attribute data is encoded with the graphical object in an encapsulated postscript element.

13. The computer-readable medium of claim 12, wherein the behavioral attribute data is encoded with a unique identifier.

14. The computer-readable medium of claim 13, wherein the behavioral attribute data further includes customized package data that specify graphic standards corresponding to a package attribute including product type, market location, package size, distribution channel, or language usage, the customized package data automatically and dynamically manipulating the physical parameters of the graphical object in response to identification of a package type.

15. A computer system configured to generate graphical objects, the computer system comprising:

a first device configured to generate a graphical object in a first graphical layout;

a second device, coupled to the first device, configured to generate behavioral attribute data associated with the graphical object, said behavioral attribute data defining physical parameters of the graphical object in a first position relative to the first graphical layout, including a position on an X axis and a Y axis of a two dimensional graph and rotational position with respect to the first graphical layout; and a third device, in response to placing said graphical object in a second graphical layout, to automatically and dynamically manipulate said physical parameters of said graphical object to reposition said graphical object to said first position relative to said second graphical layout as defined in said behavioral attribute data, including said position on an X axis and Y axis and said rotational position.

16. A computer implemented method for generating graphical objects comprising:

a) generating a graphical object in a first graphical layout;

b) responsive to manipulation of the graphical object in the first graphical layout, automatically generating and preserving behavioral attribute data associated with the graphical object relative to the first graphical layout, the behavioral attribute data defining physical parameters of the graphical object in a first position relative to the first graphical layout; and c) automatically and dynamically manipulating the physical parameters of the graphical object in response to placing the graphical object in a second graphical layout, to reposition the graphical object to the first position relative to the second graphical layout as defined in said behavioral attribute data.

17. The method of claim 16, wherein the behavioral attribute data further includes customized package data that specify graphic standards corresponding to a package attribute including product type, market location, package size, distribution channel, or language usage, the customized package data automatically and dynamically manipulating the physical parameters of the graphical object in response to identification of a package type.

18. The method of claim 16, wherein the behavioral attribute data includes scaling attribute data indicative of a size of the graphical object relative to a size of the first graphical layout, the scaling attribute data automatically and dynamically manipulates the size of the graphical object in response to the graphical object being placed in the second graphic layout.

19. The method of claim 16, wherein the behavioral attribute data is retrievable and modifiable separate from the graphical object.

20. A computer implemented method for generating graphical objects comprising:

a) generating a graphical object in a first graphical layout;

b) automatically generating behavioral attribute data associated with the graphical object, said behavioral attribute data defining physical parameters of the graphical object in a first position relative to the first graphical layout; and c) in response to placing said graphical object in a second graphical layout, automatically and dynamically manipulating said physical parameters of said graphical object as defined in said behavioral attribute data.

* * * * *